(12) United States Patent
Goldsmith et al.

(10) Patent No.: US 6,426,741 B1
(45) Date of Patent: Jul. 30, 2002

(54) USER INPUT FOR A COMPUTER

(75) Inventors: Michael A. Goldsmith, Portland; Ben S. Wymore; Cory W. Cox, both of Hillsboro, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/409,950

(22) Filed: Sep. 30, 1999

(51) Int. Cl.$^7$ ................................................. G09G 5/08
(52) U.S. Cl. ........................................ 345/158; 345/169
(58) Field of Search ................................. 345/158, 169, 345/157, 163, 156; 348/734; 340/825.19

(56) References Cited

U.S. PATENT DOCUMENTS

| | | | | |
|---|---|---|---|---|
| 5,181,181 A | * | 1/1993 | Glynn | ........................ 345/163 |
| 5,406,300 A | * | 4/1995 | Tokimoto et al. | |
| 5,734,371 A | * | 3/1998 | Kaplan | ........................ 345/158 |
| 5,835,077 A | * | 11/1998 | Dao et al. | .................... 345/157 |
| 5,903,369 A | * | 5/1999 | Hirayama et al. | |
| 6,072,467 A | * | 6/2000 | Walker | ........................ 345/158 |
| 6,201,554 B1 | * | 3/2001 | Lands | ........................ 345/169 |

* cited by examiner

Primary Examiner—Regina Liang
(74) Attorney, Agent, or Firm—Fish & Richardson P.C.

(57) ABSTRACT

Information is determined about acceleration of a user manipulated input device (using, for example, an accelerometer). A wireless communication element (e.g., a lamp) is controlled in response to the acceleration information. A computer presentation of video information to the user is controlled in response to signals of the wireless communication element.

40 Claims, 3 Drawing Sheets

USER INPUT FOR A COMPUTER

BACKGROUND OF THE INVENTION

This invention relates to user input for a computer.

In a video-enhanced interactive computer program, for example, video sequences are displayed to a viewer as part of the experience of using the program. The selection of video sequences to be played is made by the program based on actions taken by the user. The user actions may be taken using a mouse or joy stick. To enhance the interactive experience of the user, it has been proposed to enable the user to indicate actions by manipulating a hand-held wand that has no cable connection to the computer. The wand has a light that can be turned on and off by the user and the computer has a digital camera and software that can detect the turning on and off of the light from the output of the digital camera. When the user turns on the light at a moment that corresponds to an intended action, the computer can change its choice of the next video sequence to be displayed or perform any of a variety of other actions. By continually receiving the user's actions in the form of light signals from the wand and altering the selection of video sequences played back to the user, the computer program is able to provide a highly interactive experience for the user.

SUMMARY OF THE INVENTION

An embodiment of the invention enables, for example, motion of a wand to be detected automatically by accelerometers, which makes the user's interaction with a video-enhanced interactive computer program more intuitive.

In general, in the invention, information is determined about acceleration of a user manipulated input device (using, for example, an accelerometer). A wireless communication element (e.g., a lamp) is controlled in response to the acceleration information. A computer presentation of video information to the user is controlled in response to signals of the wireless communication element.

DETAILED DESCRIPTION

Figure 1:
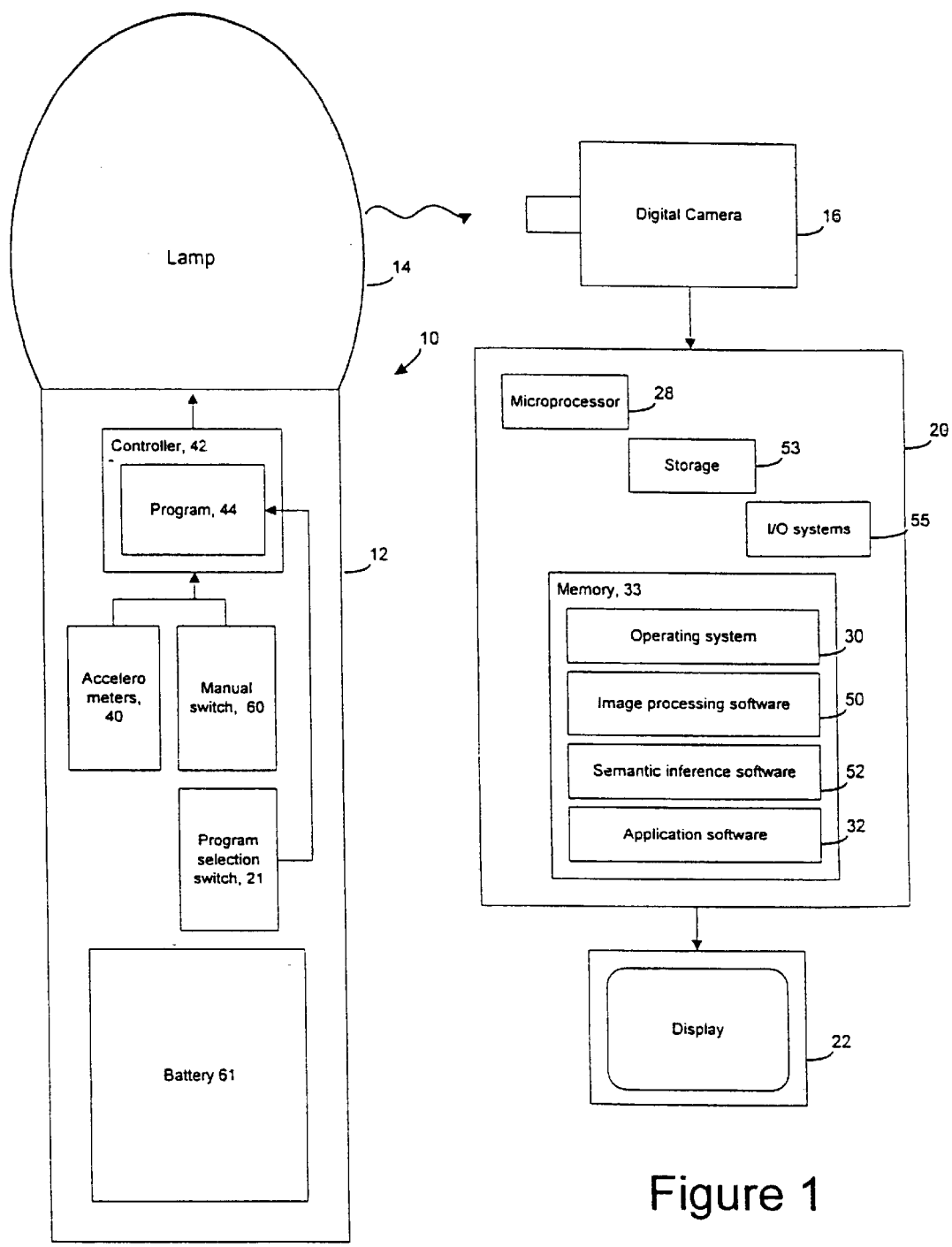
FIG. 1 is a block diagram of a wand and a computer. Accordingly to an embodiment of the present invention.

As seen in FIG. 1, a hand-held wand 10 used as an input device has a hand-sized housing 12 with a lamp 14 (a radiation source) at one end. A digital camera 16 is positioned to capture an image that includes light from lamp 14. Image data from the digital camera or an analog camera with an A to D converter is delivered to a computer 20. The computer is also connected to a video display 22. Video display 22 is visible to a person who is using the wand 10.

The computer includes a microprocessor 28 that executes an operating system 30 and application software 32 (stored in memory 33), such as a video-enhanced interactive drum playing program that provides appropriate video sequences of a drum being played. The video sequences selected for play depend on motions of the wand as it is manipulated by the user's hand to simulate the beating of a drum. A wide variety of application software could respond to the wand motions in a variety of other ways. For example, the computer could play a range of musical sounds or could speak (using speech synthesis) or move an object on the display.

The wand contains a set of accelerometers 40 that detect acceleration of the wand in any of three orthogonal axes. Acceleration signals are sent to a controller 42 (e.g., a microprocessor or special-purpose logic) where they are processed to determine instants or periods when the lamp should be flashed or continuously lit. A program 44 could also derive velocity and position information from the acceleration data. The program uses the instantaneous acceleration information (and could also use the time-dependent acceleration information and velocity and position information) to effect a pattern of lamp illumination that is appropriate to enable the user to indicate intended actions as part of his interaction with the application software being used.

The lighting pattern is determined automatically by the program in the wand without the user needing to do anything other than move the wand in a way that is relevant to the functions of the application program.

For example, in the case of the drum playing program, the program in the wand determines when a rapid deceleration of the wand occurs at the end of a downward stroke, indicating that the user is intending to "strike" a surface of a drum being displayed. The lamp would be flashed automatically. The flash is captured in images delivered from the digital camera to the computer. Image processing software 50 in the computer analyzes the images to detect the occurrence of the flash of light. In response to the flash, semantic inference software 52 also running on the computer infers that the flash meant a user drum beat and would generate a trigger to the application software. The application software plays a video sequence showing the drum head being struck and a drum beating sound is produced.

In a simple case, each drum beat of the wand by the user triggers a single flash, and the drum program displays a single beat video sequence with a corresponding single drum beat sound. In a more complicated case, the positions of the lamp flashes in a succession of images captured by the digital camera are analyzed to infer drumming of two or more different drum heads, cymbals, or other percussion instruments. The video sequence and sound for a given beat depend on which instrument the user is striking.

Figure 2:
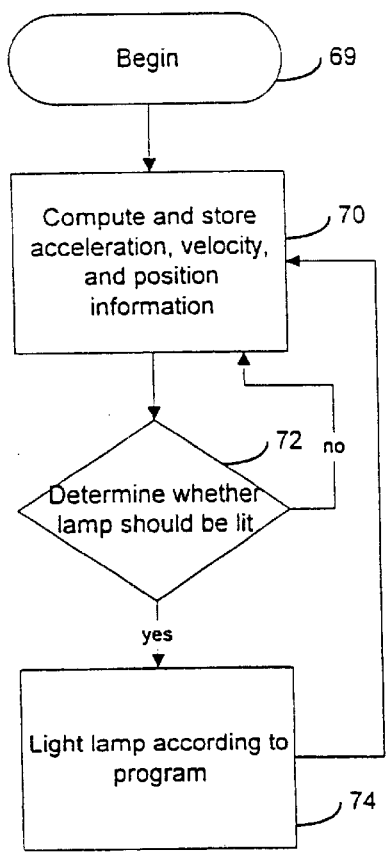
FIGS. 2 and 3 are flow charts according to an embodiment of the present invention.

Referring to FIG. 2, the program at the wand begins 69 by computing and storing acceleration, velocity, and position information 70 based on acceleration readings from the accelerometers. Sequences of readings could be stored over time. Next, the program compares the stored information with instantaneous thresholds or time sequences of values to determine whether the lamp should be lit 72. In the simple drum beating example, the threshold could represent an amount of deceleration and a simple comparison could be done with the deceleration value received from the accelerometers. Next the lamp is either lit 74 or the processing iterates, as appropriate.

Figure 3:
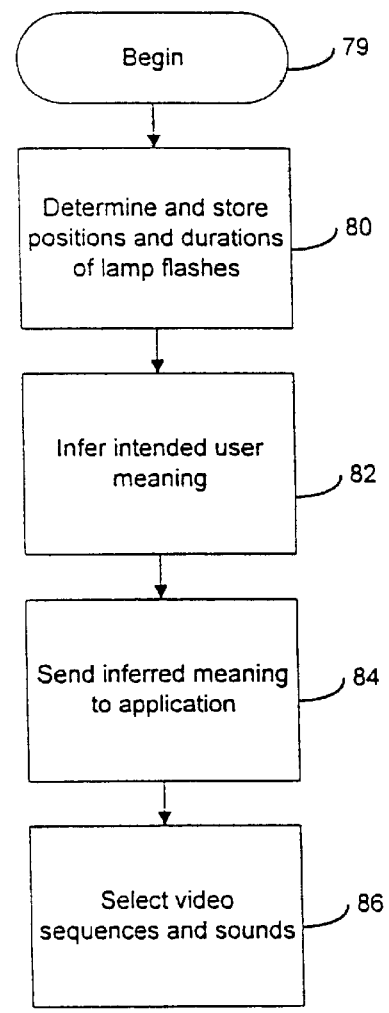

As seen in FIG. 3, at the computer, the processing of information received from the wand begins 79 with the image processing software determining and storing the times of occurrence (and, for more complex schemes, the positions and durations) of the sequences of lamp flashes 80. Next, the semantic inference software uses stored rules, thresholds, and matching sequences to infer 82, for a given application, the intended user meaning of the information received from the wand. The intended meaning would be conveyed to the application software 84. The application software would then control the selection of video sequences and sounds 86 to be performed for the user. In the simple case of the drum beating, the semantic software could simply translate the receipt of a light flash to a display of the video sequence for a drum beat.

The wand may include a manual switch 60 that would enable a user to trigger the controller to light the lamp at desired times for non-automatic control of the interface.

The manner in which the control program in the wand determines the illumination pattern for the lamp may depend on the functions which the wand is to perform for a given application. For example, the control program could effect different illumination patterns for a drumming program, an orchestra conducting program, and a ping pong game. The choice of programs could be made using a selection switch 21 controlled by the user.

Similarly the semantic inference engine could use different algorithms to infer user intended actions as appropriate for different application software. The wand includes a battery 61 for powering the electronics and lamp. The computer includes storage 53, I/O systems 55, and other conventional components, not shown.

Other embodiments are within the scope of the following claims.

For example, the interactive device could be in other forms than a wand including any useful or fantasy object or a representation of any useful or fantasy object, such as a steering wheel, a baton, a doll, a bat, a ball, a drum stick, or a piano keyboard to name only a small number. The device need not be small enough to be hand held. Other forms of radiation could be used to convey information from the wand to the computer, including infrared, sound, or radio frequency waves.

Special purpose logic could be used in the wand instead of a microprocessor.

Figure 4:
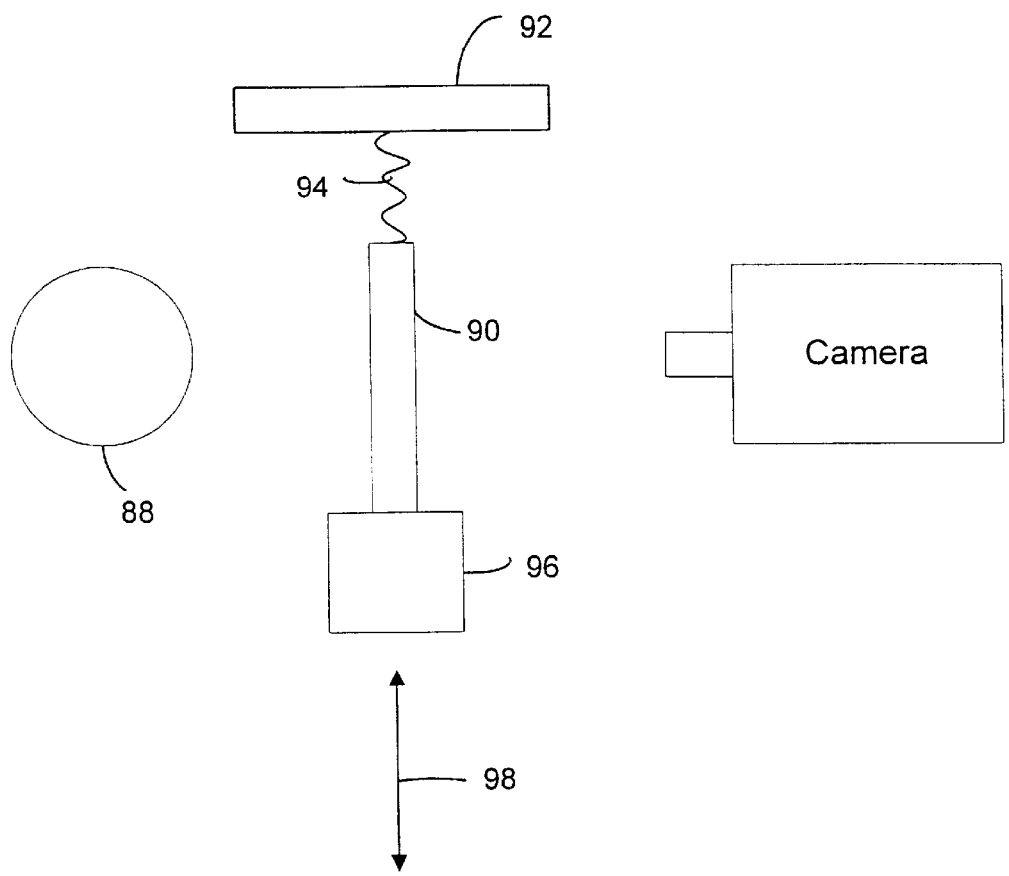
FIG. 4 is a back diagram of another embodiment of the present invention.

The wand need not use accelerometers to detect acceleration or deceleration. For example, as seen in FIG. 4, the lamp 88 could be constantly illuminated and hidden from the camera by a mechanical shutter 90. The shutter is attached to the housing 92 of the wand by a spring, holds on weight 96, and is free to move upward and downward 98. The spring and weight are chosen so that in normal use, sharp deceleration of the wand motion causes the shutter to open and shut with a similar effect to the embodiment of FIG. 1 and without the need for as much electronic circuitry.

The wand could be arranged to flash your acceleration rather than deceleration.

What is claimed is:

1. A method comprising:
   at a user manipulated input device, determining an acceleration state based on acceleration of the device comprising determining whether or not an acceleration exceeds a threshold value set to distinguish whether or not a user has initiated computer presentation of audio or video information,
   controlling a wireless communication element in the input device in response to the determined acceleration state, and
   controlling computer presentation of audio or video information in response to signals of the wireless communication element.

2. The method of claim 1 in which controlling the wireless communication element comprises illuminating the wireless communication element in response to an acceleration or a deceleration of the input device.

3. The method of claim 2 wherein the illuminating comprises moving a mechanical shutter with request to the communication element.

4. The method of claim 2 wherein the illuminating comprises turning the communication element on and off.

5. The of claim 2 wherein illuminating comprises a single illumination.

6. The method of claim 2 wherein illuminating comprises multiple illuminations.

7. The method of claim 1 further comprising:
   detecting on/off communication from the wireless communication element, and
   controlling the computer presentation in response to the detected on/off communication.

8. The method of claim 7 in which detecting the on/off communication comprises capturing an image using a camera.

9. The method of claim 7 in which controlling the computer presentation in response to the detected on/off communication comprises selecting video sequences to be displayed to the user or generating sounds or emitting synthesized speech.

10. The method of claim 1 wherein the input device comprises an accelerometer.

11. A method of enabling interaction between a user and a video display, the method comprising:
    measuring user-controlled acceleration or deceleration of a hand-held device;
    comparing the measured acceleration with a threshold value, at the hand-held device, to determine whether the user-controlled acceleration is an indication of an intended action,
    flashing a radiation source in response to a determination of an indication of an intended action,
    detecting the flashing of the radiation source, and
    altering a presentation by a computer to the user on the video display based on the detection of the flashing of the radiation source.

12. The method of claim 11 in which the altering comprises displaying a video sequence that portrays actions that correspond to the user's intended action.

13. The method of claim 11 in which the hand-held device is programmed to flash the radiation source in a manner that corresponds to actions that can be displayed in the video sequence.

14. The method of claim 11 further comprising comparing the measured acceleration with a predetermined limit.

15. The method of claim 14 wherein the radiation source is flashed when the measured acceleration passes the predetermined limit.

16. The method of claim 11 wherein flashing comprises a single irradiation.

17. The method of claim 11 wherein flashing comprises multiple irradiations.

18. The method of claim 11 wherein the radiation source comprises a lamp.

19. The method of claim 11 wherein detecting comprises detecting the position of the radiation source.

20. The method of claim 19 wherein detecting comprises using a camera.

21. The method of claim 20 wherein the camera comprises a digital camera.

22. An input device comprising:
    an element that can be accelerated and decelerated by a user to indicate intended actions,
    a controller configured to issue control signals when the element is accelerated or decelerated at a rate greater than a threshold value set to distinguish whether or not the user has indicated intended actions, and a source of radiation that is flashed in response to the control signals to provide input to an external device.

23. The input device of claim 22 in which the source of radiation comprises a lamp.

24. The input device of claim 22 further comprising:

an accelerometer.

25. The input device of claim 22 wherein the external device comprises a detector configured to detect the radiation source.

26. The input device of claim 25 wherein the detector is configured to detect a position of the radiation source.

27. The input device of claim 25 wherein the external device further comprises a controller configured to present audio or video information in response to the input.

28. The input device of claim 26 wherein the detector comprises a camera.

29. A method comprising:

by machine, performing selectable audio or video segments as part of a user interface, the audio or video segments being associated with respective actions by a user, enabling a user to accelerate or decelerate a mechanical device to indicate each of the actions, at the device, comparing the acceleration or deceleration of the device to a predetermined limit to generate information corresponding to whether or not the user has indicated each of the actions, transmitting the information from the mechanical device using a wireless communication link, receiving the transmitted information, and selecting the segments based on the received information.

30. The method of claim 29 in which the user actions correspond to actions portrayed in the video segments.

31. The method of claim 29 wherein transmitting the information further comprises illuminating the wireless communication link.

32. The method of claim 31 wherein illuminating comprises a single illumination.

33. The method of claim 31 wherein illuminating comprises multiple illuminations.

34. The method of claim 29 further comprising determining a position of the wireless communication link.

35. The method of claim 34 wherein selecting the segments is based on the position of the wireless communication link.

36. The method of claim 29 wherein the wireless communication link comprises a lamp.

37. The method of claim 29 wherein receiving the transmitted information comprises capturing an image using a camera.

38. The method of claim 29 wherein the mechanical device comprises an accelerometer.

39. A medium storing a machine-readable program that receives wireless information when a user's acceleration and deceleration of a mechanical device exceeds a threshold set to distinguish whether or not the user initiated a computer presentation of audio or video information, as determined at the mechanical device, and controls the computer presentation of audio or video information to the user in response to the wireless information.

40. The machine-readable program of claim 39 wherein the wireless information comprises light.

* * * * *